United States Patent
Pelekhaty (12) 
(10) Patent No.: US 6,215,592 B1
(45) Date of Patent: Apr. 10, 2001

(54) FABRY-PEROT OPTICAL FILTER AND METHOD OF MAKING THE SAME

(75) Inventor: Vladimir Pelekhaty, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/272,871

(22) Filed: Mar. 19, 1999

Related U.S. Application Data (60) Provisional application No. 60/078,627, filed on Mar. 19, 1998.

(51) Int. Cl.[7] ............... G02B 27/10; G02B 5/28
(52) U.S. Cl. ............ 359/618; 359/588; 359/589; 359/260; 359/127; 359/885; 385/27; 385/47; 372/10
(58) Field of Search ............ 359/586, 588, 359/589, 618, 260, 288, 885, 890, 359, 127; 385/27, 37, 73; 342/375, 157; 349/198, 128; 372/100, 19; 356/320, 352

(56) References Cited

U.S. PATENT DOCUMENTS

| | | | |
|---|---|---|---|
| 3,697,182 | 10/1972 | Erickson et al. | 356/519 |
| 4,813,756 | 3/1989 | Frenkel et al. | 385/73 |
| 5,023,944 | 6/1991 | Bradley | 359/107 |
| 5,111,321 * | 5/1992 | Patel | 349/198 |
| 5,144,498 * | 9/1992 | Vincent | 359/885 |
| 5,212,584 * | 5/1993 | Chung | 359/260 |
| 5,212,745 | 5/1993 | Miller | 385/25 |
| 5,287,214 | 2/1994 | Robertson et al. | 359/260 |
| 5,397,739 | 3/1995 | Chalmers et al. | 438/7 |
| 5,583,683 | 12/1996 | Scobey | 359/127 |
| 5,666,225 | 9/1997 | Colbourne | 359/589 |
| 5,719,989 | 2/1998 | Cushing | 359/589 |
| 5,751,466 * | 5/1998 | Dowling et al. | 359/260 |
| 5,777,793 * | 7/1998 | Little et al. | 359/589 |

(List continued on next page.)

FOREIGN PATENT DOCUMENTS

| | | |
|---|---|---|
| 0874489 | 10/1998 | (EP) . |
| 1484284 | 1/1977 | (GB) . |
| 4022902 | 1/1992 | (JP) . |

OTHER PUBLICATIONS

Macleod, H. A., "Thin–Film Optical Filters", Adam Hilger, Bristol, GB, XP002109353, pp. 270–276 PCT International Search Report, Jul. 29, 1999.

Herman van de Stadt, et al., "Multimirror Fabry–Perot Interferometers", Optical Society of America, vol. 2, No. 8, 1985, pp. 1363–1370.

*Primary Examiner*—Loha Ben
(74) *Attorney, Agent, or Firm*—Daniel N. Daisak; David L. Soltz (57) ABSTRACT

An optical filter having broad resonant frequency passbands for filtering an optical input including a plurality of multiplexed optical wavelengths into a first set of transmitted wavelengths and a second set of reflected wavelenghts. The filter has first and second inner mirrors separated substantially by an inner spacer, a first outer mirror separated from the first inner mirror substantially by a first outer spacer, and a second outer mirror separated from the second inner mirror substantially by a second outer spacer. The inner mirrors have reflectivity which is greater than the reflectivity of the outer mirrors, and are formed from layers of alternating high and low refractive index materials. The optical thicknesses of the spacers are substantially identical, and are sized to align the resonant frequency passbands of the filter with the first set of transmitted wavelengths. A method of making the filter using solid spacer(s) is disclosed wherein a plurality of spacers are formed from a single wafer of material. Also disclosed is a method of making a filter wherein the interfaces between filter segments are within the inner mirrors of the filter.

50 Claims, 7 Drawing Sheets

U.S. PATENT DOCUMENTS

| | | | |
|---|---|---|---|
| 5,781,268 | 7/1998 | Liu et al. | 349/198 |
| 5,786,915 | 7/1998 | Scobey | 359/127 |
| 6,018,421 * | 1/2000 | Cushing | 359/589 |
| 6,028,693 * | 2/2000 | Fork et al. | 359/260 |
| 6,067,391 * | 5/2000 | Land | 385/27 |
| 6,115,401 * | 9/2000 | Scobey et al. | 372/100 |

* cited by examiner

FABRY-PEROT OPTICAL FILTER AND METHOD OF MAKING THE SAME

CROSS REFERENCE TO RELATED APPLICATIONS

The present application claims the benefit of the filing date of U.S. Provisional Application No. 60/078,627, filed Mar. 19, 1998, the teachings of which are incorporated herein by reference.

FIELD OF THE INVENTION

The present invention relates in general to optical filters, and in particular to Fabry-Perot optical filters for channel selection in Wavelength Division Multiplexed systems.

BACKGROUND OF THE INVENTION

Wavelength Division Multiplexing (WDM) techniques in optical fiber systems have been utilized to significantly enhance the data carrying capacity of optical fibers. Essentially, in a WDM system multiple information streams are simultaneously transmitted on a single optical fiber at different wavelengths or channels. Early WDM systems transmitted up to four distinct channels over a single fiber. Recent technological advances are, however, allowing ever-increasing numbers of channels to be transmitted over a single fiber. Generally, systems that transmit in excess of four channels are referred to as Dense Wavelength Division Multiplexed (DWDM) systems in recognition of the closer spacing between the respective channels.

In a typical optical WDM or DWDM communication system, the distinct optical wavelengths or channels are multiplexed and propagated over an optical medium to a plurality of receivers. To ensure interoperability with other system equipment, the channels or wavelengths chosen for transmission, as well as the channel spacings, are selected to correspond to an International Telecommunication Union (ITU) channel grid. According to one such ITU channel grid, the channel spacing is 100 GHz with, for example, channel 15 at 191,500.00 GHz and channel 72 at 197,200.00 GHz.

One or more of the propagated ITU channels are selected for detection within the receiver by interposing appropriate filters between the medium and each receiver. For example, optical signals from each of N different optical signal generators with ITU channel wavelengths of $\lambda_1, \lambda_2, \ldots, \lambda_N$, respectively, are multiplexed and propagated over a system fiber connecting the various receivers. A given filter may pass only one of the ITU channel wavelengths, e.g., $\lambda_i$, from the multiplexed wavelengths present on the fiber through to the associated receiver, while the other wavelengths are reflected.

Obviously, the ability of the filter to effectively pass the desired channel(s) or wavelength(s) is critical to the operation of the overall system. Another important aspect of the filter is its effect on the system loss budget, i.e., the total amount of optical loss that a given optical link can tolerate while maintaining signal integrity. One type of filter which has been successfully employed in Wide Area Networks (WANs) is a diffraction grating. Diffraction gratings generally offer appropriate spectral resolution for reliably passing a plurality of selected channels. Unfortunately, however, diffraction gratings are bulky, lossy, and expensive. The expense of diffraction gratings and their effect on system loss budget, makes diffraction gratings impractical where cost considerations are important, e.g., for in-line, short transmission length applications such as in Local Area Networks (LANs).

A more cost-effective approach to filtering is to use a Fabry-Perot filter. Generally, a Fabry-Perot filter includes at least one pair of reflective elements, e.g. mirrors, separated by a fixed distance. By adjusting the distance between the reflective elements, the filter can be tuned to filter a selected channel. Advantageously, Fabry-Perot filters are less expensive and generate less optical loss than diffraction gratings.

One disadvantage associated with conventional Fabry-Perot filters is that they provide a very narrow resonant frequency passband, i.e. on the order of about 1–2% of the filter free spectral range (FSR). The narrow passband requires precise tuning of the filter to the signal transmitting and receiving elements, resulting in increased equipment costs. Moreover, where the filter is to be applied for filtering a plurality of spaced channels, i.e., as a comb filter, it is necessary to manufacture the filter with highly precise dimensions to ensure that the filter resonance frequencies match the desired transmission characteristics within the narrow passband. Accordingly, where Fabry-Perot filters have been used to filter a plurality of spaced channels, a separate filter has been used to separate each desired channel from the WDM signal. Using multiple Fabry-Perot filters having narrow frequency passbands is inefficient and expensive.

Accordingly, there is a need in the art for a Fabry-Perot filter which has an increased frequency passband compared to prior art designs, and which is capable of transmitting a first set of wavelengths from an input signal composed of a plurality of multiplexed optical signals and reflecting a corresponding second set of wavelengths. There is also a need in the art for a Fabry-Perot filter which may be efficiently and cost-effectively produced, and which may be used for transmitting a first set of wavelengths and reflecting a second set of wavelengths from an input composed of a plurality of multiplexed optical signals.

SUMMARY OF INVENTION

The present invention is organized about the concept of providing a Fabry-Perot optical filter for separating an optical signal including a plurality of multiplexed ITU channels into a first set of transmitted odd or even ITU channels a second set of corresponding reflected even or odd ITU channels. An exemplary three-cavity filter according to the invention includes a pair of inner mirrors separated substantially by an inner spacer, a first outer mirror separated from a first one of the inner mirrors substantially by a first outer spacer, and a second outer mirror separated from a second one of the first inner mirrors substantially by a second outer spacer. The mirrors are formed by depositing alternating layers of high and low index of refraction materials to achieve desired reflectivities. Generally, the reflectivity of the inner mirrors should be higher than the reflectivity of the outer mirrors. For example, advantageous filter characteristics may be obtained by providing inner mirrors with reflectivity of from about 70–80%, and providing the outer mirrors with a reflectivity of from about 20–30%.

The spacers may be, for example, solid or hollow, or formed by protrusions on the mirrors. The spacer optical thicknesses are adapted to cause transmission of the first set of ITU channels and reflection of the second set of ITU channels. Advantageously, a three-cavity filter according to the invention displays transmission characteristics having a broader passband at the resonant frequencies than a single-cavity Fabry-Perot filter. The broad passband transmission characteristics obviates the need for highly precise signal transmitting and receiving components in an optical communication system incorporating the filter. The overall system cost is, therefore, reduced.

In a method of making a filter according to the invention having at least two mirrors and at least one spacer, the spacer thickness is calculated to obtain an appropriate FSR for transmitting the first set of wavelenghts. A wafer of spacer material is formed to the calculated spacer thickness, and an optical beam is transmitted through the wafer while monitoring the resonant frequencies of the wafer. The wafer thickness is adjusted until the observed wafer resonant frequencies align with the first set of ITU channels. The filter is then built using sections of the wafer as the filter spacer(s).

In an exemplary method of making a three-cavity filter according to the invention, a wafer of spacer material is formed to a spacer thickness which will provide a filter free spectral range in alignment with the first set of ITU channels. At least one dielectric layer is deposited on the top surface of the wafer, and at least one dielectric layer is deposited on the bottom surface of the wafer. The dielectric layers form portions of the filter mirrors.

At least one protrusion is deposited on the top dielectric layer on the top surface of the wafer in area defining a first outer segment of the filter, a portion top dielectric layer defining an inner segment of the filter is left free of protrusions, and at least one protrusion is deposited on the top dielectric layer in an area defining a second outer segment of the filter. The first outer segment, the inner segment, and the second outer segment are then removed from the wafer. The first outer segment is joined with the inner segment with the protrusion(s) on the first outer segment positioned adjacent a first side surface of the inner segment. The second outer segment is joined with the inner segment with the protrusion(s) on the second outer segment positioned adjacent the second side surface of the inner segment. With this construction, the protrusions on the first outer segment define a space between the first outer segment and the inner segment which forms an inner dielectric layer of the first inner mirror. The protrusions on the second outer segment define a space between the second outer segment and the inner segment which forms an inner dielectric layer of the second inner mirror. Joining the segments in a manner which places the interfaces between the segments within the inner mirrors, reduces the effects on filter performance caused by any manufacturing errors associated with joining the segments.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
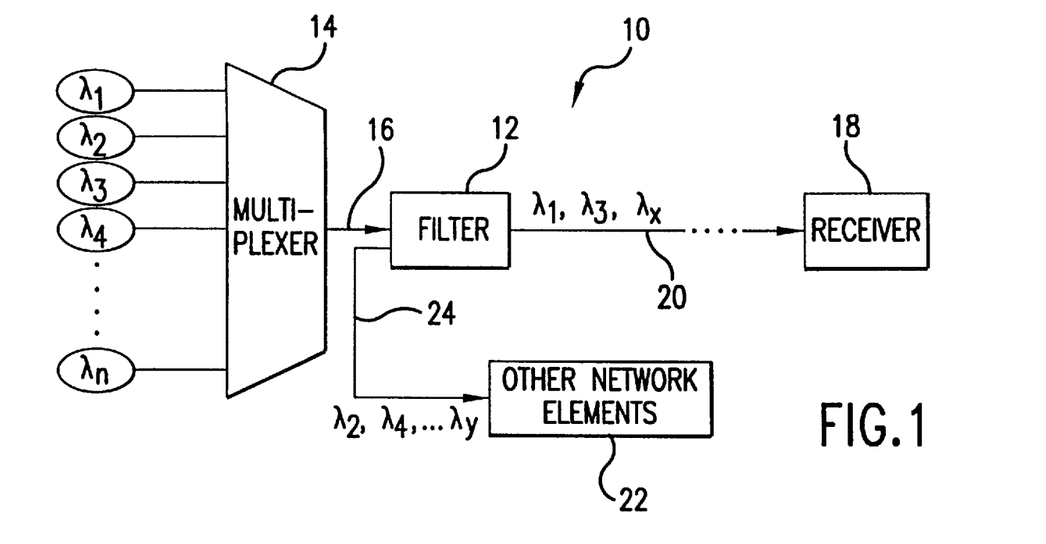
FIG. 1: is a schematic illustration of a portion of an exemplary optical communication system which may incorporate a filter in accordance with the present invention.

FIG. 1 illustrates, in diagrammatic form, an exemplary WDM optical communication system 10 including a filter 12 according to the invention. Those skilled in the art will recognize that, for ease of explanation, the system 10 has been depicted in a highly simplified form. It is to be understood, therefore, that FIG. 1 is provided for illustrative purposes only, and that the principles according to the invention may be incorporated into a wide variety of optical systems, devices, and network configurations. In particular, a filter in accordance with the present invention may be incorporated into any optical system wherein selective filtering of one or more particular optical wavelengths is desired.

As shown, in an exemplary system 10, a plurality of optical signals having wavelengths $\lambda_1, \lambda_2, \lambda_3, \lambda_4 \ldots \lambda_N$ are multiplexed by multiplexer 14 and transmitted over an optical medium 16. The optical signals having wavelengths $\lambda_1, \lambda_2, \lambda_3, \lambda_4 \ldots \lambda_N$, may be derived in a manner commonly understood in the art from, for example, SONET formatted electrical signals. The particular wavelength designations may be chosen to correspond to the ITU channel designation grid to facilitate operability with common network elements.

The filter 12 transmits a first set of selected odd wavelengths, say $\lambda_1, \lambda_3 \ldots \lambda_x$, wherein x is an odd integer, through optical medium 20, and reflects a second set of corresponding even wavelengths, $\lambda_2, \lambda_4 \ldots \lambda_y$, wherein y is an even integer, through optical medium 24. Depending on the number of channels to be separated, a plurality of filters 12 may be combined, e.g., cascaded, for appropriately separating successive channel groupings so that, for example, each system receiver, e.g., receiver 18, receives only a selected one $\lambda_x$ of the channels. Reflected channel groupings may be transmitted to other network elements 22, e.g., additional cascaded filters, along optical medium 24 for further channel separation and ultimate transmission to other system receivers.

Figure 2:
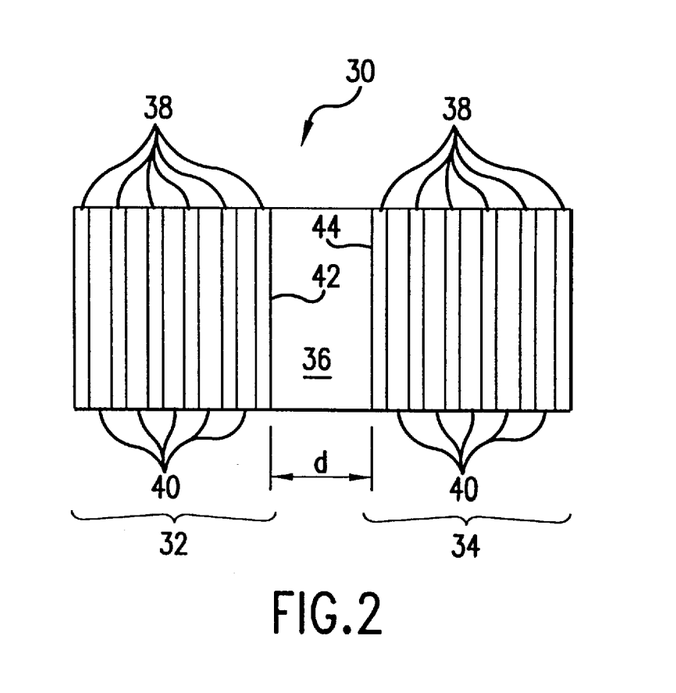
FIG. 2: is schematic illustration of a singe-cavity Fabry-Perot filter in accordance with the present invention.

FIG. 2 is a schematic illustration of an exemplary single-cavity filter 30. The filter has two spaced parallel partially reflecting mirrors 32, 34 of equal reflectivity, separated by distance d. The space between the mirrors may be filled with air or with a medium having a different refraction coefficient than air, for instance fused silica, or a liquid crystal. In the depicted embodiment, the space between the mirrors is formed by a fused silica spacer 36 having a width equal to the distance d.

The reflecting mirrors 32, 34 are formed by depositing alternating layers of high 38 and low 40 index of refraction material on opposite surfaces 42, 44 of the spacer 36. Each of the layers 38, 40 has an optical thickness, defined by the numerical product of its physical thickness times its refractive index, of odd multiples of a quarter wavelength ($\lambda/4$) at the desired transmission wavelength of the filter. Although FIG. 2 is not drawn to scale, the illustrated layers may be, for example, one quarter wavelength in optical thickness.

As will be recognized by those skilled in the art, a variety of materials may be used as the high and low index of refraction materials Exemplary materials include: $SiO_2$ (refractive index=1.46); $TiO_2$ (refractive index=2.25); $Ta_2O_5$ (refractive index=2.05); $ZrO_2$ (refractive index=2.035); $Al_2O_3$ (refractive index=1.6); and $HfO_2$ (refractive index=1.971). It is to be understood that the terms "high index of refraction" and "low index of refraction" are used herein to indicate a relative difference between the two layers of material (high and low), and, do not necessarily indicate a particular range of indexes. Thus, the high index of refraction of material 38 need only have an index of refraction which is numerically higher than the low index of refraction material 40. The numerical differences between the index of refraction in the high and low index of refraction materials effects the number of layers required for forming a mirror with a particular reflectivity. A small difference between the indices of refraction in the high and low index materials, would require a higher number of alternating layers to achieve a particular reflectivity than would be required with a larger difference.

In the single-cavity embodiment 30, the mirror reflectivity primarily effects the filter contrast. Contrast is the ratio of the maximum transmission to the minimum transmission between transmission peaks, and is given by $T_{max}/T_{min}=[(1+R)/(1-R)]^2$. For example, to achieve a contrast of approximately 20 db, the reflectivity may be chosen to be about 80%.

Figure 3:
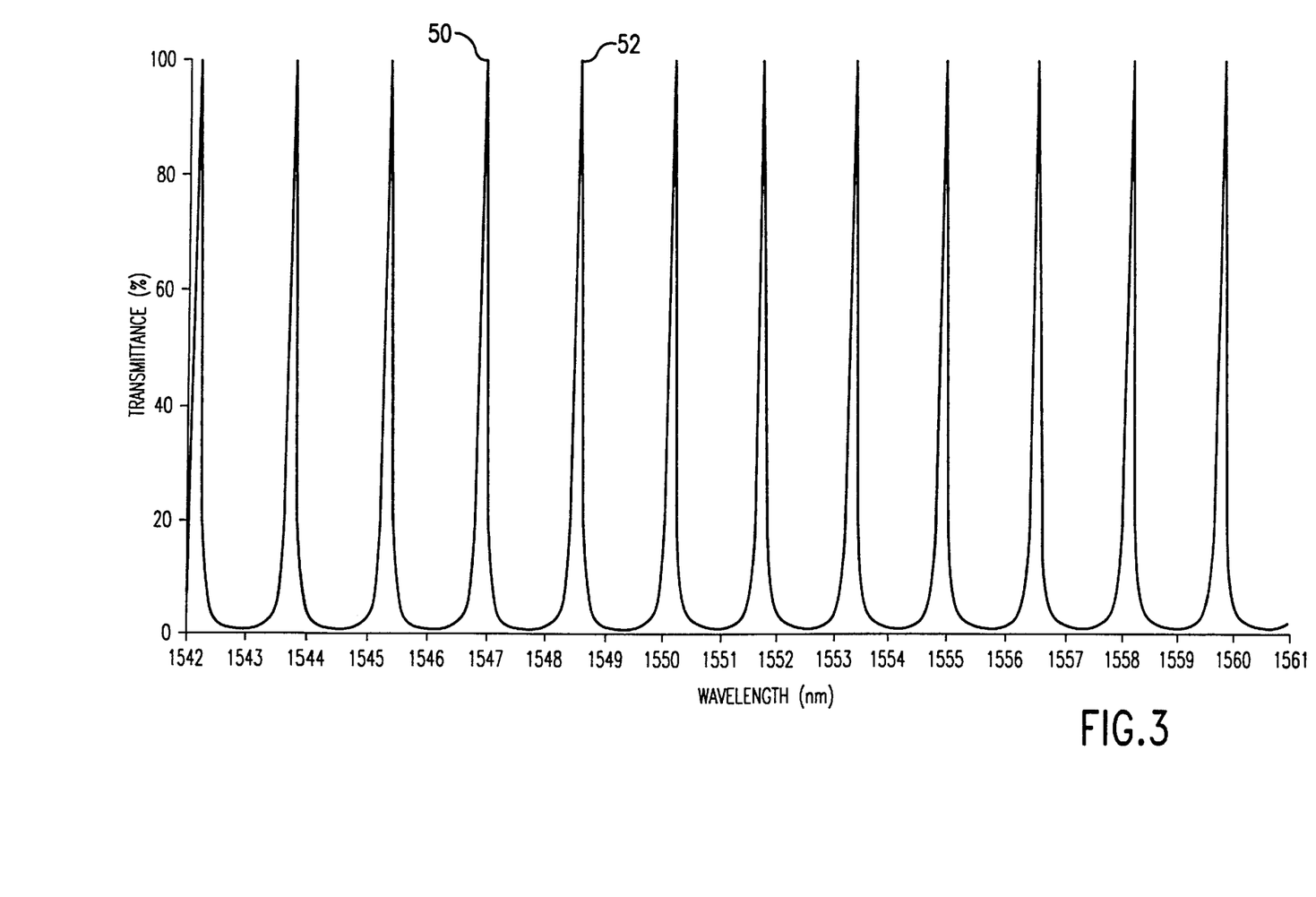
FIG. 3: is an illustration of a transmittance v. wavelength spectrum of an exemplary single-cavity Fabry-Perot filter.

FIG. 3 illustrates a transmittance vs. wavelength spectrum of the exemplary single-cavity filter depicted in FIG. 2. It is known that a Fabry-Perot filter will transmit at a number of resonant frequencies. The frequency spacing between two adjacent transmission peaks, e.g., 50 and 52, is known as the free spectral range (FSR), and is defined by:

$$FSR = c/2nd \quad \text{(equation 1)}$$

where c is the speed of light in a vacuum ($2.998 \times 10^8$ m/s), n is the refractive index of the material between the mirrors, e.g., the refractive index of spacer 36, and d is the distance between the mirrors, e.g., the thickness of the spacer. Advantageously, therefore, the FSR of the filter may be controlled by variation of the thickness and/or the refractive index of the spacer 36.

It has been found that, by virtue of the fact that the channels in the ITU channel grid have a standardized frequency separation (e.g., 100 GHz), the flexibility in design of the FSR in a Fabry-Perot filter may be utilized to define filter transmission characteristics for causing transmission of a plurality of even/odd numbered ITU channels and reflection of corresponding odd/even numbered ITU channels. For example, by designing the filter with a FSR=200 GHz, and tuning the resonant frequencies to center on a selected ITU channel, the filter will pass the selected channel and other channels having channel spacings of 200 GHz. This spacing can be associated with the even numbered channels in the ITU grid, for example, 22, 24, 26, 28 . . . which have corresponding frequency values of 192,200 GHz, 192,400 GHz, 192,600 GHz, 192,800 GHz . . . respectively. The corresponding odd numbered channels in the ITU grid, e.g., channels 23, 25, 27, 29 . . . corresponding to frequency values of 192,300 GHz, 192,500 GHz, 192,700 GHz, 192,900 GHz . . . , respectively, are reflected. Thus, by selecting the FSR for the filter at, for example, 200 GHz, a plurality of ITU channels having a 100 GHz spacing may be separated into two sets of 200 GHz spaced ITU channels, where a first set of even or odd numbered channels is transmitted, and a second set of the corresponding odd or even numbered channels is reflected.

To achieve a FSR=200 GHz, equation 1 becomes:

$$nd = c/2FSR. \quad \text{(equation 2)}$$

Substituting the values into equation 2 provides:

$$nd = \frac{2.998 \times 10^8 \text{ m/s}}{2(200 \times 10^9 \text{ Hz})} = 7.495 \times 10^{-4} \text{ m} = 749.5 \text{ } \mu m.$$

The numerical product of the index of refraction (n) of the spacer and the spacer thickness (d) is the optical thickness of the spacer. Thus, by modifying the index of refraction (n) and/or the thickness (d) of the spacer 36 to achieve nd=749.5 $\mu$m, the FSR of a Fabry-Perot filter may be set to 200 GHz. In one exemplary embodiment, the spacer material may be fused silica having an index of refraction of 1.46. Using this material, the thickness d of the spacer becomes 513.356 $\mu$m (i.e. 749.5 $\mu$m/1.46), or approximately 0.513 mm, to achieve a FSR=200 GHz.

Figure 4:
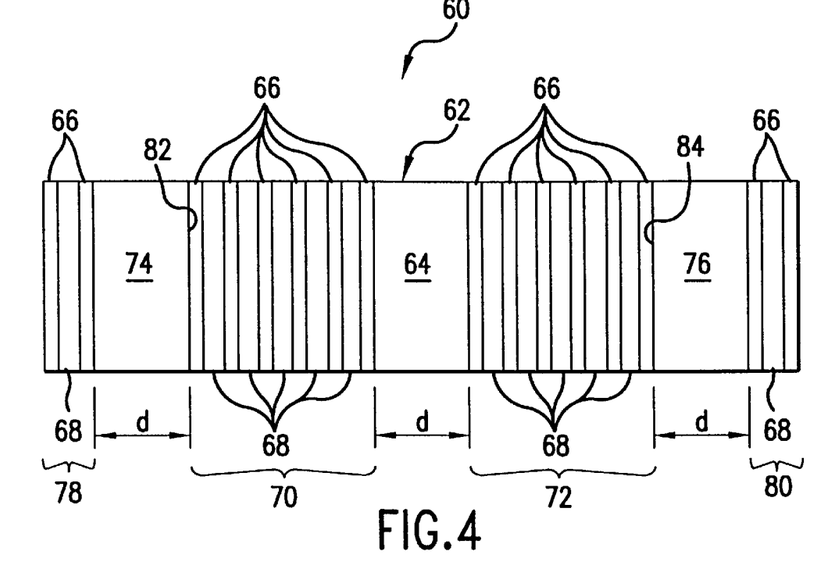
FIG. 4: is a schematic illustration of a three-cavity Fabry-Perot filter in accordance with the present invention.

Turning now to FIG. 4 there is shown an exemplary embodiment 60 of a three-cavity Fabry-Perot filter. In the illustrated embodiment, the filter includes: a center spacer 64 separating two inner mirrors 70, 72; a first end spacer 74 separating a first outer mirror 78 and inner mirror 70; and a second end spacer 76 separating a second outer mirror 80 and the inner mirror 72. The spacers 64, 74, 76 can be formed from the same material, having substantially identical thicknesses d. The mirrors 70, 72, 78, 80 are formed by alternating quarter-wave optical thickness layers of high 66 and low 68 index of refraction material. As discussed above, the optical thickness of the layers may be odd multiples of a quarter wavelength, and the number of layers required to achieve a desired reflectivity depends on the index of refraction of the materials. In the depicted embodiment, the inner mirrors 70, 72 are formed by eleven layers of alternating high (6 layers) and low (5 layers) index of refraction material, and outer mirrors are formed by three layers of alternating high and low index of refraction material.

Again, the number of layers of material in the mirrors depends on the desired mirror reflectivity and the material used for the layers. Generally, the range of the values of the reflectivities of the mirrors in the three-cavity embodiment effect the filter contrast, while the ratio of the reflectivities of the inner and outer mirrors effects ripple in the filter pass band. The reflectivity of the inner mirrors should be greater than the reflectivity of the outer mirrors. For example, in the three-cavity embodiment, it has been found that high contrast and low ripple in the transmission characteristics of the filter may be achieved by providing inner mirrors with a reflectivity between about 70–80%, and outer mirrors with reflectivity between about 20–30%.

As with the single-cavity filter, the FSR of the three-cavity filter is given by equation 1. It will be clear from equation 1 that the spacers need not have substantially identical physical thicknesses, but should have substantially identical optical thicknesses (i.e., the numerical product of physical spacer thickness times the spacer refractive index). However, in the case where the spacers are formed from the same material, e.g., fused silica, the thickness d of each of the spacers to achieve a desired FSR may be readily calculated.

Figure 5:
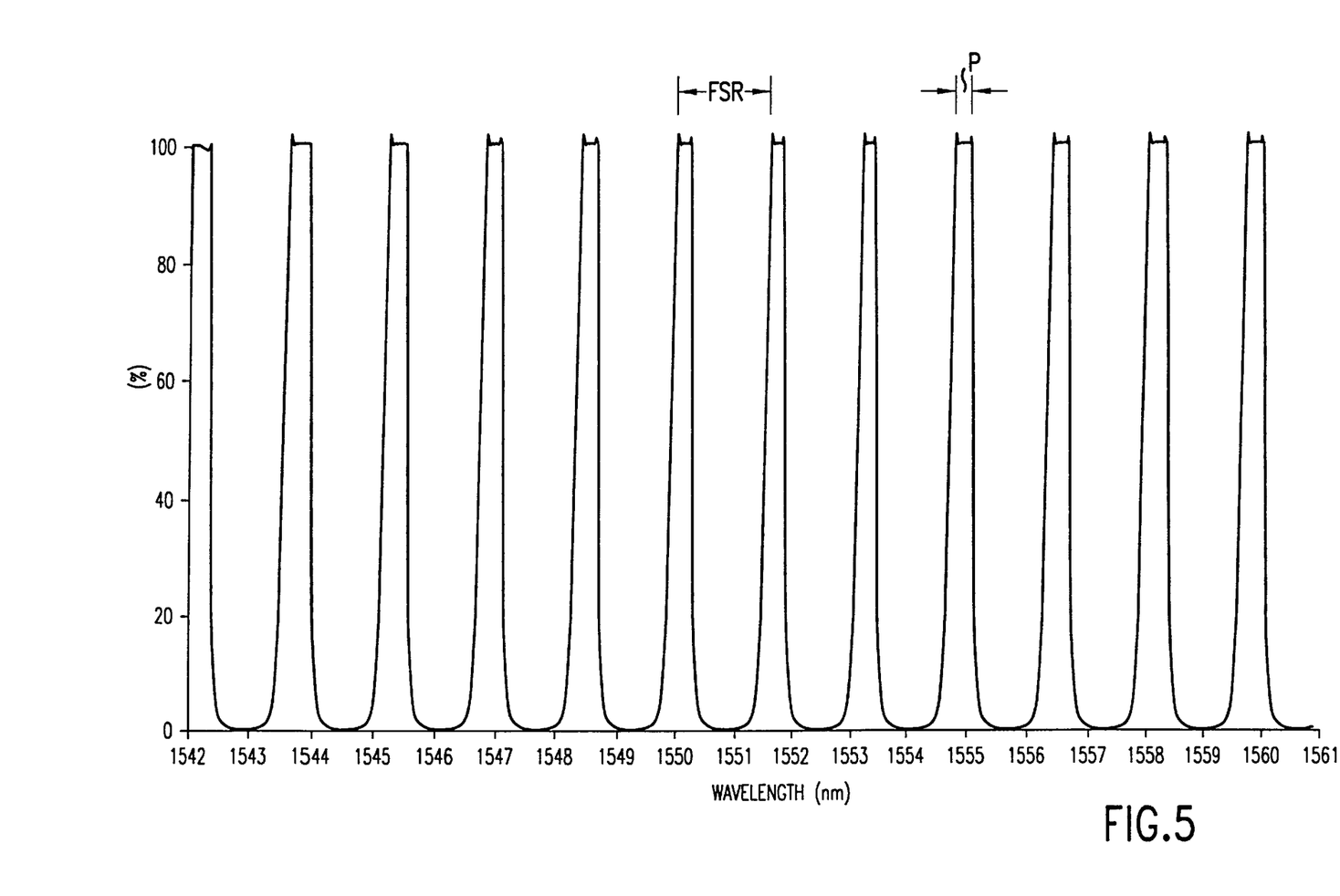
FIG. 5: is an illustration of a transmittance v. wavelength spectrum of an exemplary three-cavity Fabry-Perot filter made in accordance with the present invention.

Turning now to FIG. 5, there is illustrated a transmittance vs. wavelength spectrum of the exemplary three-cavity Fabry-Perot filter depicted in FIG. 4. As shown, the filter will resonate with FSR dependant upon the optical thickness of the spacers. Advantageously, the passband P for the three-cavity embodiment is broader and flatter than the passband in the single-cavity embodiment. For example, where the 0.5 dB level frequency passband for an exemplary single-cavity embodiment, e.g., as shown in FIG. 3, is on the order of about 1–2% of the FSR, the frequency passband for the three-cavity embodiment, wherein the inner mirrors 70, 72 have reflectivity of about 70–80% and the outer mirrors 78, 80 have reflectivity of 20–30%, is on the order of about 20% of the FSR.

Thus, as with the single-cavity embodiment, the three-cavity filter may be tuned using a desired FSR to separate a plurality of ITU channels having a set spacing into two sets of ITU channels, where a first set of even or odd numbered channels is transmitted, and a second set of the corresponding odd or even numbered channels is reflected. However, the broader passband provided by the three-cavity design obviates the need for highly precise tuning of the filter to the signal transmitting and receiving elements, as required in the single-cavity design. This translates directly into decreased cost for many of the system components. Moreover, as will be described in more detail below, the broad passband allows greater flexibility in tuning the filter resonance frequencies to align with the desired ITU channels.

Figure 6:
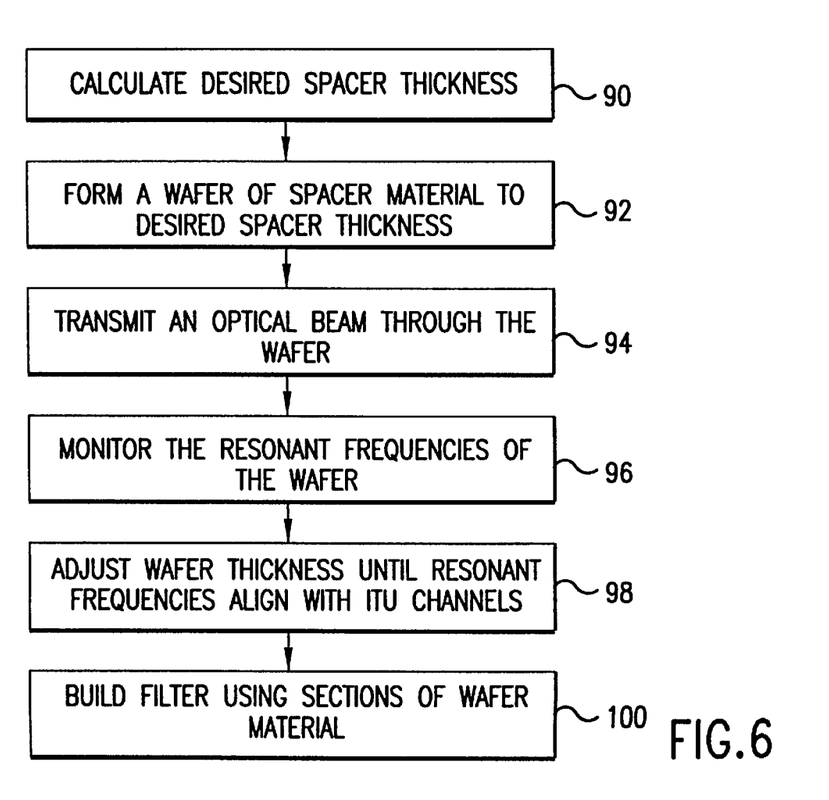
FIG. 6: is block diagram illustrating an exemplary method for making a filter in accordance with the present invention.

In a method of making a filter in accordance with the invention, each of the spacers must be tuned to ensure the resonant transmission frequencies at the desired FSR will align with the ITU channels. One method of establishing a uniform thickness for each of the spacers in the filter is illustrated in block diagram form in FIG. 6. As shown, an initial spacer thickness d is calculated 90 based on a desired FSR and equation 1. For example, to separate a plurality of ITU channels having standardized frequency spacing into a first set of transmitted odd/even channels and a second set of even/odd channels, the chosen FSR may be twice the standardized frequency spacing. Given a particular spacer material, e.g. fused silica, the spacer thickness d may be calculated using the desired FSR as:

$$d=c/2nFSR. \qquad \text{(equation 3)}$$

Once the correct spacer thickness is determined for a particular FSR, each of the spacers for a filter, or for a plurality of filters, may be made from a single wafer of spacer material. The wafer is formed 92 approximately to the thickness d by, for example, chemical or mechanical polishing. A light source, e.g., an LED or laser, is used to transmit 94 an optical beam through the wafer, and an optical spectrum analyzer is used to monitor 96 the resonant frequencies transmitted through the spacer material. Although the resonant frequencies of the bare wafer (i.e., with no mirror layers deposited on the wafer) are shallow, the spectrum analyzer may be adjusted to provide adequate detection.

Based on the resonant frequencies detected by the spectrum analyzer, the wafer thickness d is then iteratively 98 adjusted until the resonant frequencies align with the ITU channels. Although a variety of means for adjusting the thickness of the wafer will be apparent to those skilled in the art, a course adjustment of wafer thickness may be achieved, for example, by further mechanical or chemical polishing. A fine adjustment of wafer thickness may be achieved through ion beam etching. Although modifying the thickness of the wafer will also effect the FSR of the device, the modification of FSR may be tolerated where the passband of the filter is broad enough to pass the desired ITU channels despite the slight change.

Advantageously, tuning the resonant frequencies of the wafer to the desired ITU channel ensures that any spacers cut from the wafer to build 100 a filter will have substantially the same thickness and be appropriately tuned. After the appropriate wafer thickness is achieved, portions of the filter mirrors may be formed by depositing an appropriate number of layers of alternating high and low index of refraction materials on the top and/or bottom surfaces of the wafer, or on sections cut from the wafer. Individual segments may then be cut from the wafer, and the segments may be joined to complete the filter using an epoxy material having substantially the same index of refraction as the joined section.

Those skilled in the art will recognize that the portions of the wafer or the arrangement of the wafer sections on which the mirrors are deposited, and the order of joining wafer segments to form the filter, will depend on the number of layers deposited on the wafer to form the mirrors. For example, in the three-cavity embodiment illustrated in FIG. 4, once the wafer is formed, the mirrors 70 and 72 may be deposited on a wafer section which will form spacer 64, and the mirrors 68 and 80 may be formed on a wafer section which will form spacers 74 and 76. The surface 82 of spacer 74 may then be joined to the adjacent high index of refraction material 66 of mirror 70, and the surface 84 of spacer 76 may then be joined to the adjacent high index of refraction material 66 of mirror 72.

A difficulty associated with using epoxy to join the spacers and mirrors, however, is that the thickness of the epoxy adds to the distance between the mirrors, thereby affecting the FSR and the tuning of the filter. To use an epoxy to join the spacers and mirrors, therefore, the index of refraction and thickness of the epoxy must be controlled so that the epoxy either forms one of the high or low index of refraction layers of the mirror, or the epoxy is accounted for in the spacer thickness. If the index of refraction of the epoxy is chosen to match the index of refraction of the spacer, then the thickness of the epoxy must be accounted for in the thickness of the spacer when determining the appropriate spacer thickness for a desired FSR. This can make spacer formation from a single wafer more difficult, since the thickness of the wafer must be reduced to account for the thickness of the epoxy.

Figure 7:
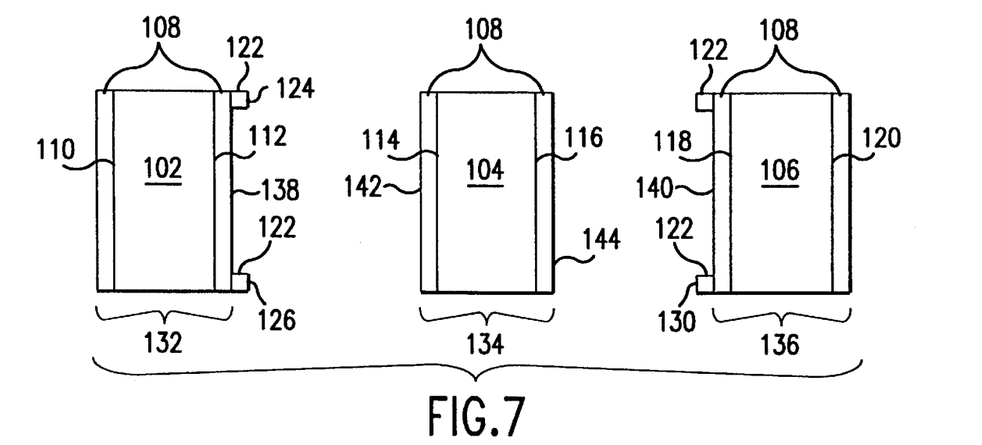
FIG. 7: is a schematic illustration of segments of an exemplary filter in accordance with the present invention wherein protrusions are deposited on the outer segments for forming a layer of an inner mirror.
Figure 8:
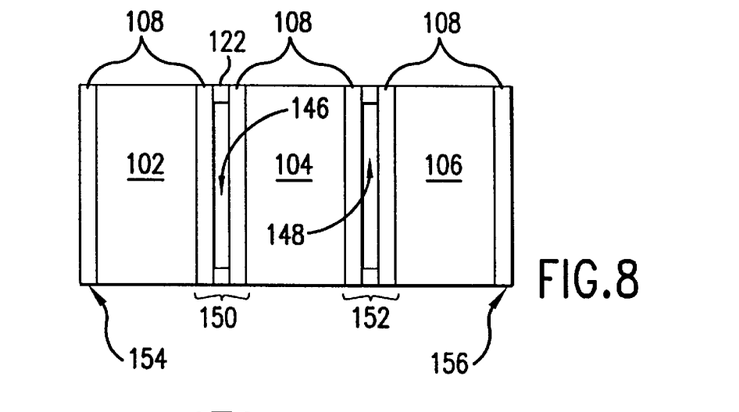
FIG. 8: is a schematic illustration of an exemplary filter in accordance with the present invention wherein inner mirror layers are formed by protrusions deposited on outer segments.
Figure 9:
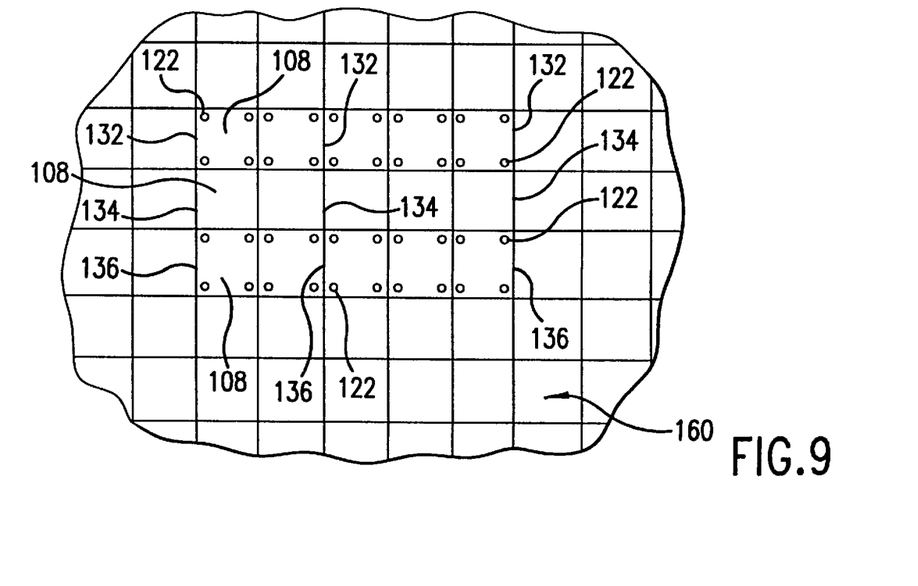
FIG. 9: is a schematic illustration of a portion of the top surface of a wafer upon which a mirror and protrusions have been deposited in a process for making a filter in accordance with the present invention.

An alternative method of building an exemplary three-cavity filter is illustrated in FIGS. 7–9. FIG. 7. depicts an inner spacer 104, a first outer spacer 102, and a second outer spacer 106. As discussed above, depending on the materials used to form the mirrors, any number of layers may be necessary to achieve a desired reflectivity for the inner and outer mirrors. Again, to achieve a relatively broad passband with high contrast and low ripple in a three-cavity embodiment, the outer mirrors may have reflectivity of from about 20–30%, while the inner mirrors may have a reflectivity of from about 70–80%.

In the illustrated embodiment, each of the spacers 102, 104, 106 has a single layer of high index of refraction material 108 deposited on opposed spacer side surfaces, i.e., surfaces 110, 112, 114, 116 and 118, 120, respectively. The spacers with mirror layers deposited thereon form a first outside spacer segment 132, an inner spacer segment 134, and a second outside spacer segment 136. The inner surface 138 of the first outside spacer segment 132 and the inner surface 140 of the second outside spacer segment 136 have protrusions 122 deposited thereon adjacent the perimeters thereof.

With reference also to FIG. 8, to assemble the filter, the end surfaces 124, 126 of the protrusions 122 on the first outside spacer segment 132 are joined to the surface 142 of the inner spacer segment (i.e., to the layer of high refractive index material on the inner spacer), and the end surfaces 128, 130 of the protrusions 122 on the second outside spacer segment 136 are joined to the surface 144 of the inner spacer segment 134 (i.e. to the layer of high refractive index material on the inner spacer). A first space 146 is thereby defined between the first outside spacer segment 132 and the inner spacer segment 134, and a second space 148 is defined between the second outside spacer segment 136 and the inner spacer segment 134.

The first space 146 forms a low index of refraction layer to create a mirror 150 with the high index of refraction layers 108 on the first outside spacer segment 132 and the inner spacer segment 134. The second space 148 forms a low index of refraction layer to create a mirror 152 with the high index of refraction layers 108 on the second outside spacer segment 136 and the inner spacer segment 134. The outer mirrors 154, 156 for the illustrated embodiment are formed by the outer high index of refraction layers 108 on the spacers 102, 106.

The spaces 146, 148 may be filed with a variety of materials to form a low index of refraction layer, e.g., air, UV curable glue, etc. The optical thicknesses of the spaces should be the same as the optical thickness of the high index of refraction layers 108, i.e., an odd multiple of quarter wavelengths. Those skilled in the art will recognize that the optical thickness of the spaces 146, 148 is controlled by the thickness of the protrusions 122 as well as the index of refraction of the material disposed within the spaces.

If the material within the spaces 146, 148 is an adhesive, such as UV curable glue, then the first and second outer spacer segments will be joined to opposed side surfaces of the inner spacer segment by adhesion of the glue to the opposed high index of refraction layers on the inner and outer spacer segments. If, however, the spaces are to be air-filled, then an epoxy may be used on the perimeter of the segments outside the optical aperture of the filter to join the outer segments 132, 136 to the inner segment 134. The protrusions 122 may be forced through the epoxy and against the high index refraction layers 108 on the inner spacer segment 134. This forces the epoxy out from between the end faces of the protrusions 122 and the high index of refraction layers 108 on the inner spacer segment 134. The epoxy, therefore, secures the outer segments to the inner segments primarily by adhesion to the surfaces of the protrusions and the high index of refraction layers 108. Advantageously, the epoxy may not substantially remain between the protrusions 122 and the layers 108, thereby allowing spaces 146, 148 to have a physical thickness which depends substantially on the dimensions of the protrusions 122.

In the embodiment illustrated in FIG. 8, the protrusions 122 and the spaces 146, 148 form a low index of refraction layer on the interior of the three-layer inner mirrors 150, 152. It is to be understood, however, that the number of layers in the mirror may vary depending on the materials used for the high and low index of refraction layers. In the case where there are in excess of three layers forming the inner mirrors, the protrusions may be provided to form any interior layer of the inner mirrors. With this arrangement, any inadvertent variation in the optical thickness of the layers has significantly less impact on the filter transmission characteristics than a variation in the optical thickness of the spacers. Thus, to the extent that epoxy, or inexact dimensions of the protrusions, creates a variation from the intended optical thickness of the layer, the effect on filter performance is relatively minimal.

Turning now to FIG. 9, in an exemplary method of making the filter using protrusions, a wafer of spacer material may be made, for example, in the manner described above in connection with FIG. 6, by forming the wafer to a thickness determined by a desired FSR and then tuning the resonant frequencies to align with the desired ITU channels. The alternating high and low index of refraction mirror layers are then deposited on the top and/or bottom surfaces of the wafer depending on the desired reflectivity and the materials used. In the illustrated embodiment, for example, a single quarter wavelength optical thickness layer of high index of refraction material 108 is deposited on the top and bottom surfaces of the wafer.

The top surface 160 of the top dielectric layer deposited on the wafer may then be viewed as being partitioned into a plurality of equal segments having dimensions of the filter mirrors and spacers, e.g., 2 mm×2 mm square segments. With reference also to FIG. 7, the segments in a first row may be considered as first outside spacer segments 132, the segments in a second row may be considered as inner spacer segments 134, and the segments in a third row may be considered as second outside spacer segments 136. The protrusions 122 for a plurality of outside spacer segments 132, 136 may then be deposited adjacent the corners of each segment in the row of first 132 and second 136 outside spacer segments. Although the protrusions 122 in FIG. 9 are depicted as being discrete circular protrusions, the protrusions may be continuous strips deposited along the top and bottom perimeters of the first and second outside spacer segments. In fact, the protrusions 122 may be in the form of any regular or irregular pattern along the perimeters of the outside spacer segments.

Advantageously, this process allows for the manufacture of several spacer segments on one wafer of spacer material. For example, when the segments 132, 134, 136 are cut from the wafer, a first filter may be formed by combining a first outside spacer segment 132 with an inner spacer segment 134 and a second outside spacer segment 136 in the manner illustrated in FIG. 8. Likewise, other first and second outside spacer segments may be combined with other inner spacer segments to form additional filters.

Figure 10:
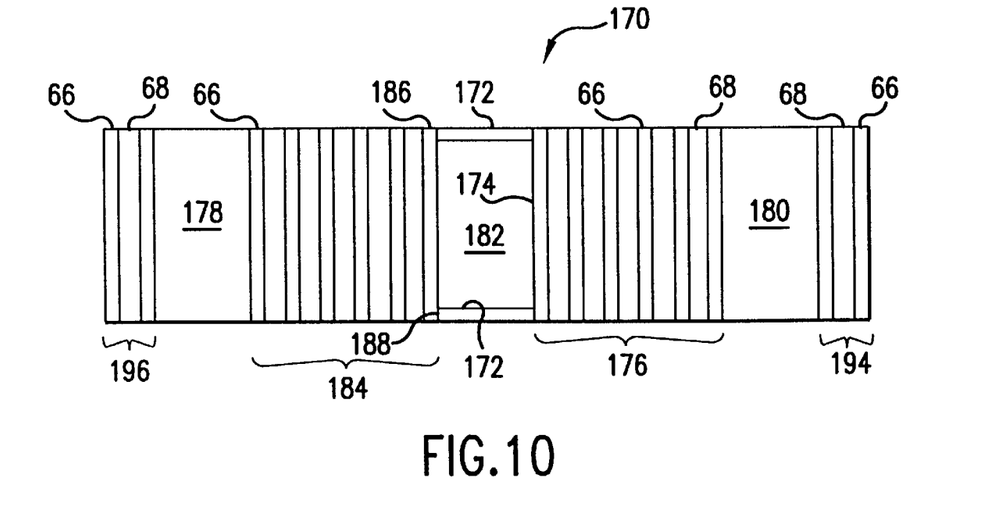
FIG. 10: is a schematic illustration of an alternative embodiment of a filter in accordance with the present invention wherein an inner spacer is formed by protrusions deposited on an inner mirror.

Despite the advantages associated with providing protrusions 122 to form interior layers of the inner mirrors in a three-cavity embodiment, it is also possible to deposit protrusions to form the spacers between the mirrors. FIG. 10 illustrates an exemplary embodiment 170 wherein continuous or discontinuous protrusions have been deposited on the perimeter of the surface of mirror 176. The mirror 176 is formed by depositing the alternating high 66 and low 68 index of refraction layers on the spacer 180. The protrusions 172 are then deposited on the mirror 176 to a thickness corresponding to an optical thickness of the space 182 between the mirrors 184, 176 required for a particular FSR Once the desired thickness of the protrusions is achieved, the mirror 184 is joined to the end surfaces 186, 188 of the protrusions 172 to form the space 182. The space 182 may be filled with air, UV curable glue, etc., to achieve an optical thickness substantially equal to the optical thickness of the end spacers 178, 180.

Figure 11:
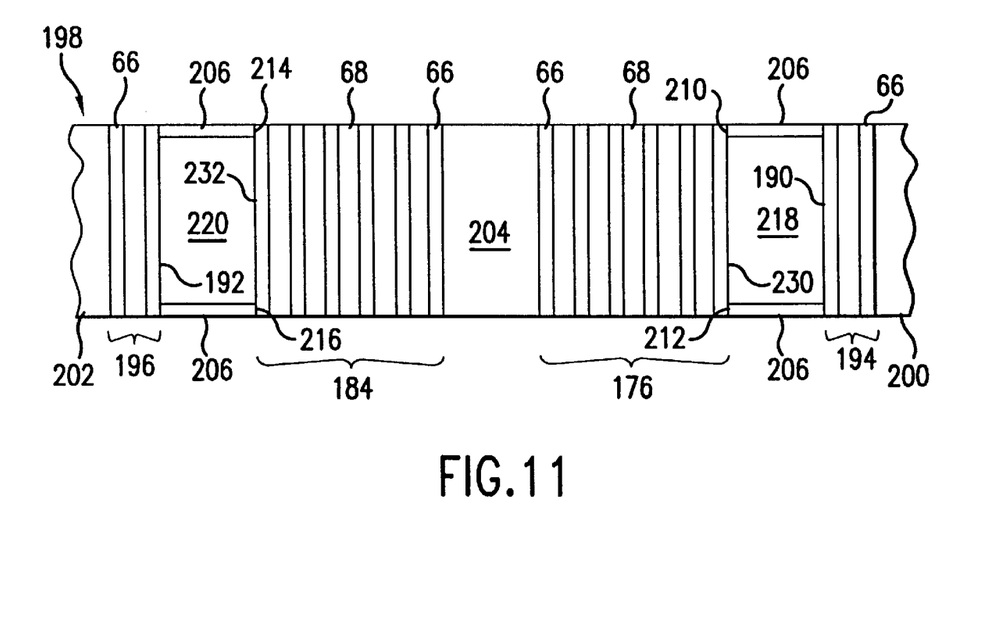
FIG. 11: is a schematic illustration of an alternative embodiment of a filter in accordance with the present invention wherein first and second outer spacers are formed by protrusions deposited on the outer mirrors.

FIG. 11. illustrates an exemplary embodiment 198 wherein protrusions 206 have been deposited on the surfaces 190, 192 of the mirrors 194, 196 which have been deposited on glass substrates 200, 202. The mirrors 184, 176 are deposited on the spacer 204. The end surfaces 210, 212, 214, 216 of the protrusions are joined to the opposed surfaces 230, 232 of mirrors, 176, 184, respectively, to form spaces 218, 220 having an optical thickness substantially equal to the optical thickness of the spacer 204 as determined from the desired FSR. Although the protrusions in the illustrated embodiment are indicated as being deposited on the surfaces 190, 192, it is to be understood that they may also be deposited on surfaces 230, 232 of mirrors 184, 176. In this case, the end surfaces of the protrusions would be joined to the surfaces 190, 192 of mirrors 194, 196.

Figure 12:
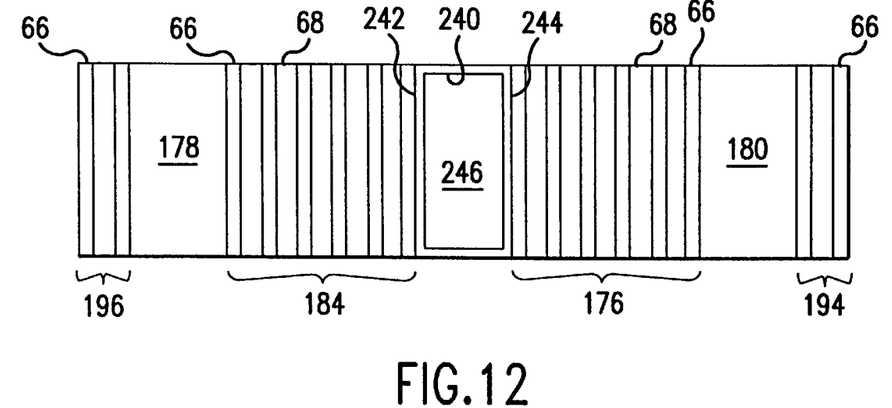
FIG. 12: is a schematic illustration of an alternative embodiment of a filter in accordance with the present invention wherein an inner spacer is a hollow spacer joined between two inner mirrors.

Another alternative embodiment of a three-cavity filter is schematically illustrated in the lengthwise sectional view of FIG. 12. As shown, in the depicted embodiment a hollow spacer 240 is provided between mirrors 184, 176 to define an inner space 246. The hollow spacer geometrically corresponds to the shape of the mirror, e.g., the spacer may be cylindrical so that its end surfaces 242, 244 match round mirrors. The thickness of the spacer is chosen to produce an optical thickness between the mirrors 184, 176 which is substantially identical to the optical thicknesses of the end spacers 178, 180.

In this embodiment, the high 66 and low 68 index of refraction materials which form the mirrors 196, 184, 176, 194 are deposited on the surfaces of the spacers 178, 180. The end surfaces 242, 244 of the hollow spacer 240 are joined to the mirrors 184, 176, respectively, to form the inner space 246. The space 246 is filled with material, e.g., air, UV curable glue, to achieve an optical thickness for the space 246 which matches the optical thicknesses of the spacers 178, 180 determined from the desired FSR.

Figure 13:
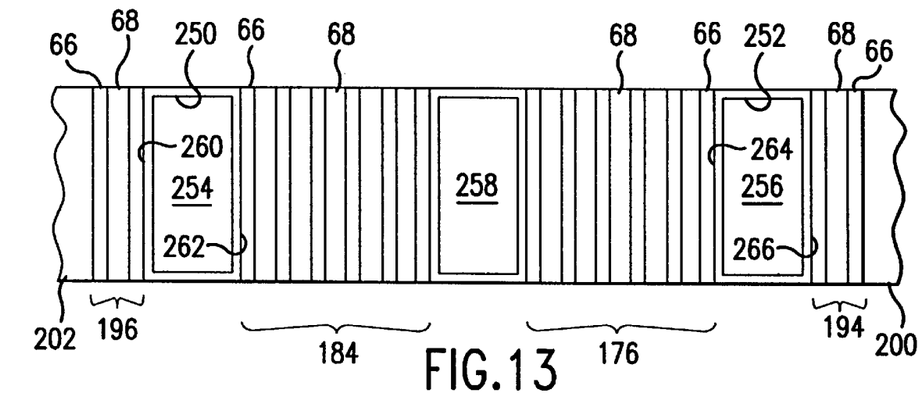
FIG. 13: is a schematic illustration of an alternative embodiment of a filter in accordance with the present invention wherein first and second outer spacers are hollow spacers joined between inner and outer mirrors.

FIG. 13 provides another alternative embodiment wherein hollow spacers 250, 252 are used to form first 254 and second 256 end spaces. In the depicted embodiment, the mirrors 194, 196 are deposited on substrates 200, 202, e.g., silica glass, to achieve the desired reflectivity, which may be between about 20–30%. The mirrors 184, 176 are deposited on the center spacer 258. The surface 260 of the first hollow spacer 250 is joined to the mirror 196, and the surface 262 is joined to the mirror 184. The surface 264 of the second hollow spacer 252 is joined to the mirror 176, and the surface 266 is joined to the mirror 194. The spaces 254, 256 are filled with material, e.g., air, UV curable glue, to achieve an optical thickness for the spaces 254, 256 which match the optical thicknesses of the spacer 258 as determined from the desired FSR.

Figure 14:
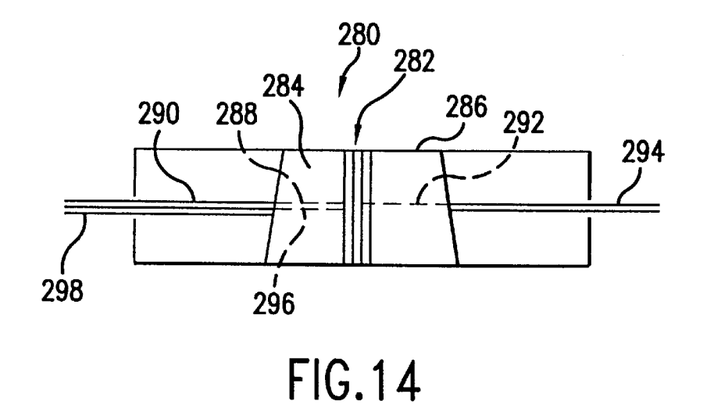
FIG. 14: is schematic illustration of an exemplary structure for combining a filter in accordance with the present invention into an optical system.

Those skilled in the art will recognize that in any embodiment of a filter according to the present invention, there are a variety of ways to combine the filter into a structure for forming an even/odd ITU channel separator. FIG. 14 schematically illustrates an exemplary embodiment of one such structure 280 wherein a filter 282 according to the invention has been combined with first 284 and second 286 grin lens collimators. In the depicted embodiment, an optical beam 288 comprising a plurality of multiplexed optical signals having wavelengths corresponding to an ITU grid travels from an input fiber in the direction of the filter 282, and is collimated by the first grin lens 284. The filter transmits a plurality of odd or even numbered ITU channels, as represented by beam 292, which are coupled by the second grin lens 286 into a transmission fiber 294. The remaining even or odd numbered ITU channels, as represented by beam 296, are reflected by the filter and coupled by the grin lens 284 into a reflection fiber 298.

There is thus provided an optical filter for separating an optical input composed of a plurality of multiplexed wavelengths into a first set of transmitted wavelengths and a second set of reflected wavelengths. Advantageously, a three-cavity embodiment according to the invention displays a broader resonant frequency pass band than a single-cavity embodiment, thereby obviating the need for highly precise transmitting and receiving components where filtering of a plurality of signals by the single filter is desired. Overall system costs are, therefore, reduced. There is also provided an efficient and cost-effective method of making a single or multiple-cavity filter according to the invention wherein the spacer(s) are formed from a single wafer by transmitting a beam through the wafer and adjusting spacer thickness while monitoring the resonant frequencies of the wafer. A method of making a filter according to the invention wherein filter segments are joined so that the interfaces between segments are within the inner mirrors of the filter is also provided. The detrimental effects of any manufacturing errors or inconsistencies in joining the segments are thereby reduced.

The embodiments which have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An optical filter for filtering an optical input including a plurality of multiplexed optical wavelengths, said filter comprising:

first and second inner mirrors separated substantially by an inner spacer;

a first outer mirror separated from said first inner mirror substantially by a first outer spacer; and a second outer mirror separated from said second inner mirror substantially by a second outer spacer;

wherein said first and second inner mirrors have reflectivity which is greater than the reflectivity of said first and second outer mirrors, and wherein said inner spacer and said first and second outer spacers have substantially identical optical thicknesses, said optical thicknesses being adapted to align resonant transmission frequency passbands of said filter with a pre-determined first set of said multiplexed optical wavelengths for transmitting said pre-determined first set of said multiplexed optical wavelengths and reflecting a pre-determined second set of said multiplexed optical wavelenghts.

2. An optical filter according to claim 1, wherein said predetermined first set of said multiplexed optical wavelengths comprises a plurality of odd numbered ITU channels, and wherein said pre-determined second set of said multiplexed optical wavelengths comprises a plurality of even numbered ITU channels.

3. An optical filter according to claim 2, wherein said plurality of odd numbered ITU channels are separated by a frequency spacing of 200 GHz.

4. An optical filter according to claim 1, wherein said predetermined first set of said multiplexed optical wavelengths comprises a plurality of even numbered ITU channels, and wherein said pre-determined second set of said multiplexed optical wavelengths comprises a plurality of odd numbered ITU channels.

5. An optical filter according to claim 4, wherein said plurality of even numbered ITU channels are separated by a frequency spacing of 200 GHz.

6. An optical filter according to claim 1, wherein said filter has a free spectral range determined approximately in accordance with:

$$FSR = c/2nd$$

wherein FSR corresponds to the free spectral range required for transmitting said pre-determined first set of said multiplexed optical wavelengths, and c corresponds to the speed of light in a vacuum, and wherein nd corresponds to the optical thickness of each of said spacers, with n corresponding to the index of refraction for each of said spacers and d corresponding to the physical thickness of each of said spacers.

7. An optical filter according to claim 1, wherein said first and second inner mirrors comprise a plurality of dielectric layers, said plurality of dielectric layers having alternating layers of high and low index of refraction material, and wherein said first and second outer mirrors comprise at least one dielectric layer.

8. An optical filter according to claim 7, wherein, in each of said first and second inner mirrors, a first one of said dielectric layers has a protrusion extending therefrom, said protrusion extending to a second one of said dielectric layers to form a space between said first and second ones of said dielectric layers, said space being filled to define a third one of said dielectric layers.

9. An optical filter according to claim 8, wherein said third one of said dielectric layers is one of said low index of refraction material layers.

10. An optical filter according to claim 8, wherein said space is air-filled.

11. An optical filter according to claim 8, wherein said space is filled with a UV curable glue.

12. An optical filter according to claim 7, wherein each of said dielectric layers in said first and second inner mirrors and said at least one dielectric layer in said first and second outer mirrors have substantially identical optical thicknesses, said optical thicknesses being substantially equal to an odd multiple of quarter wavelengths for a selected one of said wavelengths from said pre-determined first set of said multiplexed optical wavelengths.

13. An optical filter according to claim 7, wherein said first and second outer mirrors comprise a plurality of dielectric layers, said plurality of dielectric layers having alternating layers of high and low index of refraction material.

14. An optical filter according to claim 7, wherein each of said dielectric layers in said first and second inner mirrors and said at least one dielectric layer in said first and second outer mirrors are comprised of a material selected from the group consisting essentially of:

$SiO_2$, $Ta_2O_5$, $TiO_2$, $Al_2O_3$, $HfO_2$, and $ZrO_2$.

15. An optical filter according to claim 1, wherein the reflectivity of said first and second inner mirrors is between about 70–80%, and wherein the reflectivity of said first and second outer mirrors is between about 20–30%.

16. A optical filter according to claim 1, wherein at least one of said spacers is a solid spacer.

17. An optical filter according to claim 1, wherein each of said spacers is a solid spacer.

18. An optical filter according to claim 17, wherein each of said solid spacers is fused silica.

19. An optical filter according to claim 18, wherein each of said fused silica spacers has a physical thickness of approximately 0.513 mm.

20. An optical filter according to claim 1, wherein at least one of said spacers is a hollow spacer.

21. An optical filter according to claim 1, wherein said first and second inner mirrors comprise a plurality of dielectric layers, and wherein said inner spacer is at least partially formed by at least one protrusion deposited on one of said dielectric layers and extending between said first and second inner mirrors.

22. An optical filter according to claim 1, wherein at least one of said first and second outer spacers is at least partially formed by at least one protrusion extending between one of said outer mirrors and one of said inner mirrors.

23. An optical filter for filtering optical input signals including a plurality of multiplexed ITU channels, said filter comprising:
    first and second inner mirrors comprising a plurality of dielectric layers and having reflectivity of between about 70–80%, said plurality of dielectric layers having alternating layers of high and low index of refraction material;
    an inner spacer separating said first and second inner mirrors;
    a first outer mirror comprising at least one dielectric layer and having reflectivity of between about 20–30%;
    a first outer spacer separating said first outer mirror and said first inner mirror;
    a second outer mirror comprising at least one dielectric layer and having reflectivity which is substantially identical to the reflectivity of said first outer mirror;
    a second outer spacer separating said second outer mirror and said second inner mirror;
    wherein each of said dielectric layers in said first and second inner mirrors and said at least one dielectric layer in said first and second outer mirrors have substantially identical optical thicknesses, said optical thicknesses being substantially equal to an odd multiple of quarter wavelengths corresponding to an ITU channel selected from a pre-determined first set of said multiplexed ITU channels to be transmitted by said filter; and
    wherein said inner spacer and said first and second outer spacers have substantially identical optical thicknesses, said optical thicknesses being adapted to align resonant transmission frequency passbands of said filter with said pre-determined first set of said multiplexed ITU channels for transmitting said pre-determined first set of said multiplexed ITU channels and reflecting a pre-determined second set of said multiplexed ITU channels.

24. An optical filter according to claim 23, wherein said pre-determined first set of said multiplexed ITU channels comprises a plurality of odd numbered ITU channels, and wherein said pre-determined second set of said multiplexed ITU channels comprises a plurality of even numbered ITU channels.

25. An optical filter according to claim 24, wherein said plurality of odd numbered ITU channels are separated by a frequency spacing of 200 GHz.

26. An optical filter according to claim 23, wherein said predetermined first set of said multiplexed ITU channels comprises a plurality of even numbered ITU channels, and wherein said pre-determined second set of said multiplexed ITU channels comprises a plurality of odd numbered ITU channels.

27. An optical filter according to claim 26, wherein said even numbered ITU channels are separated by a frequency spacing of 200 GHz.

28. An optical filter according to claim 23, wherein filter has a free spectral range determined approximately in accordance with:

$$FSR=c/2nd$$

wherein FSR corresponds to the free spectral range required for transmitting said pre-determined first set of said multiplexed ITU channels, and c corresponds to the speed of light in a vacuum, and wherein nd corresponds to the optical thickness of each of said spacers, with n corresponding to the index of refraction for each of said spacers and d corresponding to the physical thickness of each of said spacers.

29. An optical filter according to claim 23, wherein each of said spacers is a fused silica spacer having physical thickness of approximately 0.513 mm.

30. An optical filter according to claim 23, wherein, in each of said first and second inner mirrors, a first one of said dielectric layers has a protrusion extending therefrom, said protrusion extending to a second one of said dielectric layers to form a space between said first and second ones of said dielectric layers, said space being filled to define a third one of said dielectric layers.

31. An optical filter according to claim 30, wherein said third one of said dielectric layers is one of said low index of refraction material layers.

32. An optical filter according to claim 30, wherein said space is air-filled.

33. An optical filter according to claim 30, wherein said space is filled with a UV curable glue.

34. A method of making an optical filter for filtering optical input signals including a plurality of multiplexed optical channels, each at a respective wavelength, into a pre-determined first set of said multiplexed optical channels to be transmitted by said filter and a pre-determined second set of said multiplexed optical channels to be reflected by said filter, said filter having at least two mirrors separated substantially by a spacer, said method comprising the steps of:

calculating a desired spacer thickness for establishing a filter free spectral range corresponding to the frequency spacing of said pre-determined first set of said multiplexed optical channels;

forming a wafer of spacer material to said desired spacer thickness;

transmitting an optical beam through said wafer;

monitoring the resonant frequencies of the wafer;

adjusting the wafer thickness until said resonant frequencies align with said pre-determined first set of said multiplexed optical channels; and building said filter using a portion of said wafer as said spacer.

35. A method according to claim 34 wherein said filter comprises first and second inner mirrors separated substantially by a first one of said spacers; a first outer mirror separated from said first inner mirror substantially by a second one of said spacers; and a second outer mirror separated from said second inner mirror substantially by a third one of said spacers;

wherein said building step comprises building said filter using separate portions of said wafer for said first, second, and third spacers.

36. A method according to claim 34, wherein said building step further comprises depositing at least one dielectric layer on a surface of said wafer to form at least a portion of at least one of said mirrors.

37. A method according to claim 34, wherein said forming step comprises chemically polishing said wafer to said desired spacer thickness.

38. A method according to claim 34, wherein said forming step comprises mechanically polishing said wafer to said desired spacer thickness.

39. A method according to claim 34, wherein said adjusting step comprises ion beam etching said wafer to adjust said wafer thickness.

40. A method according to claim 34, wherein said monitoring step comprises monitoring said resonant frequencies using an optical spectrum analyzer.

41. A method according to claim 34 wherein said filter comprises first and second inner mirrors separated substantially by a first one of said spacers; a first outer mirror separated from said first inner mirror substantially by a second one of said spacers; and a second outer mirror separated from said second inner mirror substantially by a third one of said spacers; wherein said building step comprises:

depositing a first dielectric layer on a top surface of said wafer;

depositing a second dielectric layer on a bottom surface of said wafer;

depositing at least one protrusion on said first dielectric layer in area defining a first outer segment of said filter;

leaving a portion of the surface of said first dielectric layer free of protrusions in an area defining an inner segment of said filter;

depositing at least one protrusion on said first dielectric layer in an area defining a second outer segment of said filter;

removing said first outer segment, said inner segment, and said second outer segment from said wafer;

joining said first outer segment and said inner segment with said at least one protrusion on said first outer segment positioned adjacent a first side surface of said inner segment; and joining said second outer segment and said inner segment with said at least one protrusion on said second outer segment positioned adjacent a second side surface of said inner segment, whereby said at least one protrusion on said first outer segment defines a space between said first outer segment and said inner segment, said space defining an inner dielectric layer of said first inner mirror, and whereby said at least one protrusion on said second outer segment defines a space between said second outer segment and said inner segment, said space defining an inner dielectric layer of said second inner mirror.

42. A method according to claim 41, wherein said depositing steps comprise depositing sufficient numbers of dielectric layers on said top and bottom surfaces of said wafer so that when said first and second outer segments are joined to said inner segment, said inner mirrors have reflectivity of between about 70–80% and said outer mirrors have reflectivity of between about 20–30%.

43. A method according to claim 41, wherein said at least one top dielectric layer and said at least one bottom dielectric layer are both high index of refraction material layers, and wherein said space between said first outer segment and said inner segment and said space between said second outer segment and said inner segment are both filled so that said inner dielectric layers of said first and second inner mirrors are low index of refraction material layers.

44. A method according to claim 43, wherein said space between said first outer segment and said inner segment and said space between said second outer segment and said inner segment are both air-filled.

45. A method according to claim 43, wherein said space between said first outer segment and said inner segment and said space between said second outer segment and said inner segment both filled with a UV curable glue.

46. A method of making an optical filter for filtering optical input signals including a plurality of multiplexed optical wavelengths into a pre-determined first set of said multiplexed optical wavelengths to be transmitted by said filter and a pre-determined second set said multiplexed optical wavelengths to be reflected by said filter, said filter comprising first and second inner mirrors separated substantially by a first spacer, a first outer mirror separated from said first inner mirror substantially by a second spacer, and a second outer mirror separated from said second inner mirror substantially by a third spacer, said method comprising:

forming a wafer of spacer material to a spacer thickness which will provide a filter free spectral range in alignment with said pre-determined first set of said multiplexed optical wavelengths;

depositing a first dielectric layer on a top surface of said wafer;

depositing a second dielectric layer on a bottom surface of said wafer;

depositing at least one protrusion on said first dielectric layer in an area defining a first outer segment of said filter;

leaving a portion of the surface of said first dielectric layer free of protrusions in an area defining an inner segment of said filter;

depositing at least one protrusion on said first dielectric layer in an area defining a second outer segment of said filter;

removing said first outer segment, said inner segment, and said second outer segment from said wafer;

joining said first outer segment and said inner segment with said at least one protrusion on said first outer segment positioned adjacent a first side surface of said inner segment; and joining said second outer segment and said inner segment with said at least one protrusion on said second outer segment positioned adjacent a second side surface of said inner segment;

whereby said at least one protrusion on said first outer segment defines a space between said first outer segment and said inner segment, said space defining an inner dielectric layer of said first inner mirror, and whereby said at least one protrusion on said second outer segment defines a space between said second outer segment and said inner segment, said space defining an inner dielectric layer of said second inner mirror.

47. A method according to claim 46, wherein said depositing steps comprise depositing sufficient numbers of dielectric layers on said top and bottom surfaces of said wafer so that when said first and second outer segments are joined to said inner segment, said inner mirrors have reflectivity of between about 70–80% and said outer mirrors have reflectivity of between about 20–30%.

48. A method according to claim 46, wherein said first dielectric layer and said second dielectric layer material have an associated high index of refraction, and wherein said space between said first outer segment and said inner segment and said space between said second outer segment and said inner segment are both filled so that said inner dielectric layers of said first and second inner mirrors have an associated low index of refraction.

49. A method according to claim 48, wherein said space between said first outer segment and said inner segment and said space between said second outer segment and said inner segment are both air-filled.

50. A method according to claim 48, said method further comprising filling said space between said first outer segment and said inner segment and said space between said second outer segment and said inner segment with a UV curable glue.

* * * * *